(12) United States Patent
Dyrdal et al.

(10) Patent No.: US 12,384,194 B2
(45) Date of Patent: Aug. 12, 2025

(54) ENGRAVABLE HEAT TRANSFER LABELS AND EMBELLISHMENTS

(71) Applicant: Avery Dennison Retail Information Services LLC, Mentor, OH (US)

(72) Inventors: Tom Dyrdal, Hafslo (NO); Andrew Lillesaeter-Spendlove, Kaupanger (NO)

(73) Assignee: Avery Dennison Retail Information Services LLC, Mentor, OH (US)

( * ) Notice: Subject to any disclaimer, the term of this patent is extended or adjusted under 35 U.S.C. 154(b) by 91 days.

(21) Appl. No.: 18/249,075

(22) PCT Filed: Oct. 15, 2021

(86) PCT No.: PCT/US2021/055279
§ 371 (c)(1),
(2) Date: Apr. 14, 2023

(87) PCT Pub. No.: WO2022/082044
PCT Pub. Date: Apr. 21, 2022

(65) Prior Publication Data
US 2023/0391134 A1     Dec. 7, 2023

Related U.S. Application Data

(60) Provisional application No. 63/092,953, filed on Oct. 16, 2020.

(51) Int. Cl.
*B44C 1/17*     (2006.01)
*B41M 5/26*     (2006.01)
(Continued)

(52) U.S. Cl.
CPC ........... *B44C 1/1712* (2013.01); *B41M 5/262* (2013.01); *B41M 5/267* (2013.01); *B44C 3/005* (2013.01);
(Continued)

(58) Field of Classification Search
CPC ....... B44C 1/1712; B44C 3/005; B44C 1/228; B41M 5/262; B41M 5/267; B41M 5/24;
(Continued)

(56) References Cited

U.S. PATENT DOCUMENTS

| | | | |
|---|---|---|---|
| 4,256,795 A | | 3/1981 | Day et al. |
| 5,677,049 A | * | 10/1997 | Torii ..................... B41M 5/395 |
| | | | 428/354 |

(Continued)

FOREIGN PATENT DOCUMENTS

| | | |
|---|---|---|
| DE | 2822411 | 12/1978 |
| EP | 1091853 | 11/2003 |

(Continued)

OTHER PUBLICATIONS

International Search Report and Written Opinion dated Feb. 2, 2022 issued in corresponding IA No. PCT/US2021/055279 filed Oct. 15, 2021.

*Primary Examiner* — Patricia L. Nordmeyer (57) ABSTRACT

Described herein a heat transfer label comprising a support portion comprising a release layer having a first side and a second side and a first carrier at least partially disposed on the first side of the release layer; and a transfer portion comprising a engravable first ink layer having a first side and a second side; and an adhesive layer having a first side and a second side, wherein a graphic design is engraved on the first ink layer using the laser light after the heat transfer label is at least partially bonded onto a substrate. Also described herein are methods of laser engraving a heat transfer label comprising at least partially bonding the heat transfer label described herein onto a substrate; and at least partially laser engraving the ink layer.

15 Claims, 5 Drawing Sheets

(51) Int. Cl.
*B44C 3/00* (2006.01)
*C09J 7/21* (2018.01)
*C09J 7/25* (2018.01)
*C09J 7/40* (2018.01)

(52) U.S. Cl.
CPC .............. *C09J 7/21* (2018.01); *C09J 7/255* (2018.01); *C09J 7/401* (2018.01); *C09J 2400/283* (2013.01); *C09J 2467/006* (2013.01); *C09J 2483/005* (2013.01)

(58) Field of Classification Search
CPC ... B41M 7/009; C09J 7/21; C09J 7/255; C09J 7/401; C09J 2400/283; C09J 2467/006; C09J 2483/005
See application file for complete search history.

(56) References Cited

U.S. PATENT DOCUMENTS

| | | | |
|---|---|---|---|
| 5,708,047 A | 1/1998 | Kamen et al. | |
| 5,985,078 A | 11/1999 | Suess et al. | |
| 6,358,660 B1 | 3/2002 | Agler et al. | |
| 7,065,820 B2 | 6/2006 | Meschter | |
| 8,883,293 B2 | 11/2014 | Weedlun et al. | |
| 9,499,937 B2 | 11/2016 | He et al. | |
| 9,931,804 B2 | 4/2018 | Le et al. | |
| 2001/0025687 A1 | 10/2001 | Cross | |
| 2009/0057280 A1 | 3/2009 | Jaw | |
| 2009/0057959 A1 | 3/2009 | Jaw | |
| 2011/0149349 A1* | 6/2011 | Siebert | B32B 27/36 358/3.29 |
| 2011/0189477 A1* | 8/2011 | Miracle | B41M 3/12 428/347 |
| 2017/0318906 A1 | 11/2017 | Van Dyk et al. | |
| 2018/0165737 A1 | 6/2018 | Love et al. | |
| 2019/0092065 A1 | 3/2019 | Dinescu et al. | |
| 2020/0027147 A1 | 1/2020 | Dahlstrom et al. | |

FOREIGN PATENT DOCUMENTS

| | | |
|---|---|---|
| EP | 0537668 | 1/2004 |
| EP | 2300240 | 1/2017 |
| WO | 00/00352 | 1/2000 |

* cited by examiner

ENGRAVABLE HEAT TRANSFER LABELS AND EMBELLISHMENTS

CROSS-REFERENCE TO RELATED APPLICATION

This application is a 371 of International Application No. PCT/US2021/055279, which was published in English on Apr. 21, 2022, and claims the benefit of U.S. Provisional Patent Application No. 63/092,953 filed Oct. 16, 2020, both of which are incorporated herein by reference in their entireties.

BACKGROUND

Heat transfer labels and embellishments (collectively, heat transfer labels) are commonly used to decorate and/or to label many types of articles and substrates. Heat transfer labels are typically manufactured with one or more heat-transfer labels printed on a removable carrier web. Typically, labels include thermoplastic inks and/or adhesives that are heat-activated to adhere the heat transfer label to a carrier or substrate. Heat transfer labels have also been used broadly in other identification or personalization products such as caps, binders, shoes, tote bags, toys, consumer electronics, sports gear, and the like that are found in retail stores, schools, sport activities, camps, gyms, and other places. Besides textile and fabric-related substrates, heat transfer labels may be used on substrates such as yarns, wood, paper, plastic, metal, glass, composites, or combinations thereof.

When a user applies a heat transfer label, the label is placed adhesive-side down onto the substrate and heat is applied to the back of the label substrate to transfer the text and/or graphic to the item from the release layer of the label substrate.

Unfortunately, this process is done during production of an article due to the nature of the heat transfer label. This limits the ability to customize an article at the point of sale. Further, it may be difficult to maintain a consistent inventory of articles with heat transfer labels since certain articles with the heat transfer labels may sell faster than others.

Therefore, there exists in the art a long felt need to manufacture a heat transfer label that may be customized or made on demand.

SUMMARY

Multiple aspects of this disclosure may be embodied separately or together in the devices and systems described and claimed below. These aspects may be employed alone or in combination with other aspects of the subject matter described in the summary, the detailed description, and the claims, and the description of these aspects in various embodiments is not intended to preclude the use or claiming of these aspects separately or in different combinations.

Embodiments for an engravable heat transfer label and a method of laser engraving the heat transfer label are shown and described. More particularly, the heat transfer label described herein relates generally to a heat transfer label that is at least partially bonded onto a substrate before engraving of a graphic design using the laser light. Advantageously, the heat transfer label may be at bonded at needle point, after the product is made, at warehouse or store, including point-of-sale bonding and along with customizable laser engravings.

In one exemplary embodiment, a heat transfer label comprises a support portion comprising a release layer having a first side and a second side and a first carrier at least partially disposed on the first side of the release layer; and a transfer portion comprising: a engravable first ink layer having a first side and a second side; and an adhesive layer having a first side and a second side; wherein the second side of the first ink layer is at least partially disposed on the first side of the adhesive layer; wherein the second side of the release layer is at least partially disposed on the first side of the first ink layer; wherein a graphic design is engraved on the first ink layer using the laser light; and wherein the graphic design being engraved after the heat transfer label is at least partially bonded onto a substrate. The substrate is selected from textiles, yarns, wood, paper, plastic, metal, glass, composites, or combinations thereof.

In some embodiments, the heat transfer label may comprise a second ink layer having a first side and a second side, wherein the second side of the second ink layer is at least partially disposed on the first side of the adhesive layer and the first side of the second ink layer is at least partially disposed on the second side of the first ink layer. In yet other embodiments, a graphic design is engraved on the second ink layer using the laser light; and wherein the graphic design being engraved after the heat transfer label is at least partially bonded onto a substrate.

In other embodiments, the first ink layer and the second ink layer may comprise at least one additive selected from color pigment, glitter pigment, filler and combinations thereof.

In yet other embodiments, the heat transfer label may further comprise at least one additional ink layer at least partially disposed on the first side of the second ink layer. In other embodiments, the heat transfer label may comprise a second carrier, at least partially disposed on the second side of the adhesive layer.

In some embodiments, the laser engraving of the first ink layer has a gloss difference of at least 3.0 GU (gloss units) at a 60-degree angle using ASTM D523 and provides a Delta E (dE) color difference of at least 1.0 using ASTM D2244. In other embodiments, the laser engraving of the second ink layer has a gloss difference of at least 3.0 GU (gloss units) at a 60-degree angle using ASTM D523 and provides a Delta E (dE) color difference of at least 1.0 using ASTM D2244.

In some embodiments, the release layer is a coating, a polymeric film or combination thereof. In other embodiments, the release layer comprises a silicone release layer, a wax solution, a wax dispersion, a polymeric binder comprising wax particles, or combinations thereof.

In some embodiments, the first carrier comprises PET film, paper, or combinations thereof. The first carrier further comprises a thermoset coating comprising polyurethane, acrylics, formaldehyde free melamine resins, or combinations thereof.

In a another exemplary embodiment, a method of laser engraving a heat transfer label comprises positioning the heat transfer label onto a substrate; applying heat and pressure to the heat transfer label and the substrate to bond the heat transfer label to the substrate; removing the support portion; and at least partially laser engraving the first ink layer.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Described herein with respect to some embodiments of this disclosure is a heat transfer label comprising a support portion comprising a release layer having a first side and a second side and a first carrier at least partially disposed on the first side of the release layer; and a transfer portion comprising an engravable first ink layer having a first side and a second side; and an adhesive layer having a first side and a second side. The second side of the first ink layer is at least partially disposed on the first side of the adhesive layer and the second side of the release layer is at least partially disposed on the first side of the first ink layer. A graphic design is engraved on the first ink layer using the laser light; after the heat transfer label is at least partially bonded onto a substrate.

As used herein, the word "graphic design" means and includes "patterns, logos, texts, holograms, signatures, pictures, photos, and barcodes." The embodiments described herein are not limiting, but rather are exemplary only.

In some alternate embodiments, a heat transfer label may have a different construction where a heat transfer label comprises a support portion comprising a release layer having a first side and a second side and a first carrier at least partially disposed on the second side of the release layer; and a transfer portion comprising a first ink layer having a first side and a second side; and an adhesive layer having a first side and a second side. The second side of the first ink layer is at least partially disposed on the first side of the adhesive layer; and the release layer of the support portion is at least partially disposed on the adhesive layer of the transfer portion. A graphic design is engraved on the first ink layer using the laser light; after the heat transfer label is at least partially bonded onto a substrate. For both constructions described herein, the characteristics of the portions and layers may be similar as described below unless otherwise noted.

In some embodiments, the release layer of the heat transfer label is a coating. In other embodiments, the release layer is a film. The release layer may comprise a silicone release layer, a wax solution, a wax dispersion, a polymeric binder comprising wax particles, or combinations thereof. Other types are also contemplated.

In many embodiments, the first carrier of the heat transfer label comprises PET film, paper, or combinations thereof. In some embodiments, the first carrier further comprises a thermoset coating comprising polyurethane, acrylics, formaldehyde free melamine resins, or combinations thereof.

In many embodiments, the first ink layer of the heat transfer label comprises polyurethane ink, polyacrylate ink, or combinations thereof. In some embodiments, the first ink layer comprises at least one additive selected from color pigment, glitter pigment, filler and combinations thereof. In one embodiment, the first ink layer comprises one color. In another embodiment, the first ink layer comprises more than one color.

In many embodiments, the adhesive layer of the heat transfer label comprises a polyurethane adhesive, polyamide adhesive, polyester adhesive, ethyl vinyl acetate (EVA) adhesive, acrylic adhesive, or combinations thereof. The adhesive layer may be activated at a temperature between 50° C. and 200° C. In some embodiments, the adhesive layer is activated at a temperature between 50° C. and 180° C. In another embodiment, the adhesive layer is activated at a temperature between 50° C. and 160° C. In yet another embodiment, the adhesive layer is activated at a temperature between 50° C. and 150° C.

In some embodiments, the heat transfer label further comprises a second ink layer having a first side and a second side, wherein the second side of the second ink layer is at least partially disposed on the adhesive layer and the second side of the first ink layer. In many embodiments, the second ink layer comprises polyurethane ink, polyacrylate ink, or combinations thereof. In some embodiments, the second ink layer comprises at least one additive selected from color pigment, glitter pigment, filler and combinations thereof. In one embodiment, the second ink layer comprises one color. In other embodiments, the second ink layer comprises more than one color.

In yet other embodiments, the heat transfer label may further comprise at least one additional ink layer at least partially disposed on the first side of the second ink layer. In many embodiments, at least one additional ink layer may comprise polyurethane ink, polyacrylate ink, or combinations thereof. In some embodiments, the additional ink layer comprises at least one additive selected from color pigment, glitter pigment, filler and combinations thereof. In one embodiment, at least one additional ink layer may comprise one color. In other embodiments, at least one additional ink layer may comprise more than one color.

In many embodiments, the first ink layer may be laser engraved after the heat transfer label is at least partially bonded on the substrate. Laser engraving may occur through the use of a laser light machine. For laser engraving, a laser is used to remove at least a portion of the first ink layer to a specified depth but not penetrate through the adhesive and/or the substrate. In some embodiments, the laser may remove/ablate at least a portion of the first ink layer such that the substrate may be visible. In other embodiments, the laser may remove/ablate at least a portion of the first ink layer such that the second ink layer may be visible. For some embodiments, the laser engraving of the first ink layer may have a gloss difference of at least 3.0 GU (gloss units) at a 60-degree angle using ASTM D523 compared to the first ink layer without laser engraving. In other embodiments, the laser engraving of the first ink layer may have a gloss difference of at least 5.0 GU (gloss units) at a 60-degree angle using ASTM D523. In yet other embodiments, the laser engraving of the first ink layer may have a gloss difference of at least 7.0 GU (gloss units) at a 60-degree angle using ASTM D523. In some embodiments, the laser engraving of the first ink layer provides a Delta E (dE) color difference of at least 1.0 using ASTM D2244. In other embodiments, the laser engraving of the first ink layer provides a Delta E (dE) color difference of at least 1.5 using ASTM D2244. In yet another embodiment, the laser engraving of the first ink layer provides a Delta E (dE) color difference of at least 2.0 using ASTM D2244.

In those embodiments where the second side of the second ink layer is at least partially disposed on the first side of the first ink layer, the second ink layer may be laser engraved after the heat transfer label is at least partially disposed on the substrate. In some embodiments, the laser engraving of the second ink layer has a gloss difference of at least 3.0 GU (gloss units) at a 60-degree angle using ASTM D523 compared to the first ink layer without laser engraving. In other embodiments, the laser engraving of the second ink layer may have a gloss difference of at least 5.0 GU (gloss units) at a 60-degree angle using ASTM D523. In yet other embodiments, the laser engraving of the second ink layer may have a gloss difference of at least 7.0 GU (gloss units) at a 60-degree angle using ASTM D523. In some embodiments, the laser engraving of the second ink layer provides a Delta E (dE) color difference of at least 1.0 using ASTM D2244. In other embodiments, the laser engraving of the second ink layer provides a Delta E (dE) color difference of at least 1.5 using ASTM D2244. In yet another embodiment, the laser engraving of the second ink layer provides a Delta E (dE) color difference of at least 2.0 using ASTM D2244.

In various embodiments, at least one of the first ink layer or the second ink layer of the heat transfer label are engraved with help of laser light to reveal one or more subsequent layer with different color, glow or effect to form the final image.

In a variety of embodiments, laser marking or laser etching may be used instead of laser engraving. Laser marking may discolor a surface of the material, while laser etching may remove material. For example, in some embodiments, laser marking may be created by moving a lower-powered laser beam across a material such as the first ink layer or the second ink layer to create marks. The laser may heat the material, and may cause oxidation, which may turn the material black. The surface of the material may be left intact. Laser marking may be used for laser coloration, laser dark marking, charring of plastic materials or annealing for metals. Laser marking may involve annealing, carbon migration, foaming, or coloration.

In various embodiments, laser engraving may refer to etching, deep laser engraving, or laser ablation. In these embodiments, the laser may use high heat to melt a material. In some embodiments, the melted material may create a raised mark. Laser etching may remove 0.001" or less of the material.

Figure 1:
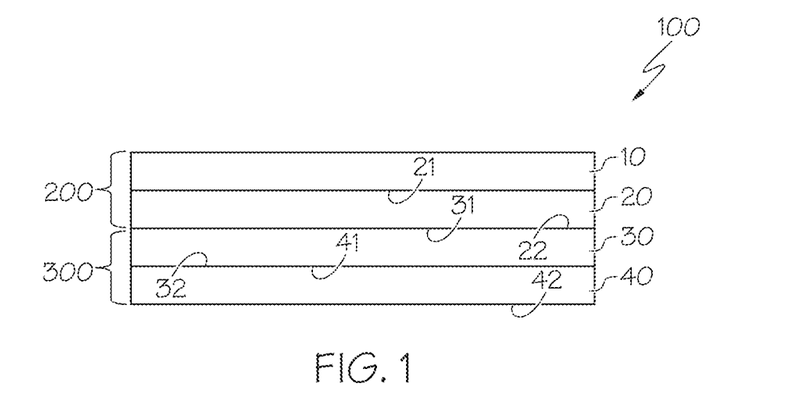
FIG. 1 is an exemplary diagram showing one embodiment of a heat transfer label.

Referring to exemplary FIG. 1, one embodiment of the heat transfer label 100 is shown. Here, the heat transfer label 100 comprises: (1) a support portion 200 comprising a release layer 20 having a first side 21 and a second side 22 and a first carrier 10 at least partially disposed on the first side 21 of the release layer 20; and (2) a transfer portion 300 comprising: (a) a first ink layer 30 having a first side 31 and a second side 32; and (b) an adhesive layer 40 having a first side 41 and a second side 42; wherein the second side 32 of the first ink layer 30 is at least partially disposed on the first side 41 of the adhesive layer 40; wherein the second side 22 of the release layer 20 is at least partially disposed on the first side 31 of the first ink layer 30.

Figure 2:
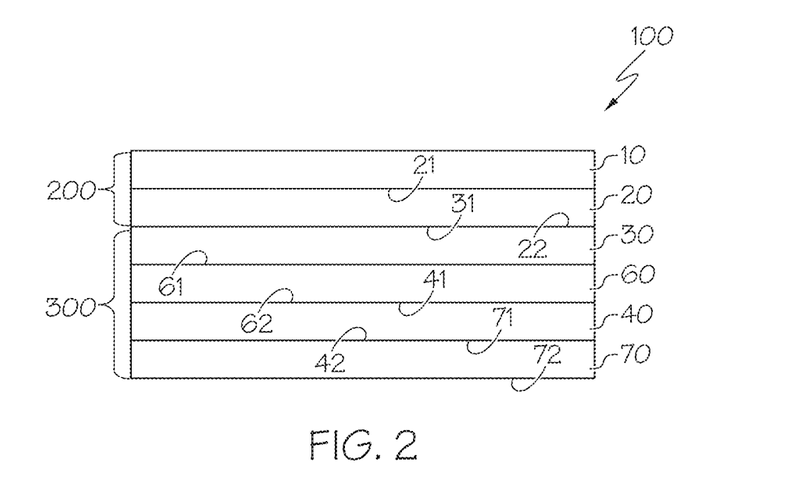
FIG. 2 is an exemplary diagram showing another embodiment of a heat transfer label.

Referring now to exemplary FIG. 2, a second embodiment of the heat transfer label 100 of FIG. 1 is shown where a second ink layer is present. At least one additional ink layer may be contemplated by not shown in FIG. 2. In this embodiment, both the optional second ink layer 60 and the optional second carrier 70 are shown. Although both the optional second ink layer 60 and the optional second carrier 70 are shown, embodiments with only the optional second ink layer 60 or only the optional second carrier 70 are contemplated. For this embodiment of the heat transfer label 100, the heat transfer label 100 comprises: (1) a support portion 200 comprising a release layer 20 having a first side 21 and a second side 22 and a first carrier 10 at least partially disposed on the first side 21 of the release layer 20; and (2) a transfer portion 300 comprising: (a) a second ink layer 60 having a first side 61 and a second side 62; (b) a first ink layer 30 having a first side 31 and a second side 32; (c) an adhesive layer 40 having a first side 41 and a second side 42; and (d) a second carrier 70 having a first side 71 and a second side 72; wherein the second side 32 of the first ink layer 30 is at least partially disposed on the first side 61 of the optional second ink layer 60 and the second side 62 of the release layer 20 is at least partially disposed on the first side 31 of the first ink layer 30; wherein the second side 62 of the second ink layer 60 is at least partially disposed on the first side 41 of the adhesive layer 40; wherein the second side 42 of the adhesive layer 40 is at least partially disposed on the first side 71 of the second carrier 70; and wherein the heat transfer label 100 is at least partially bonded onto a substrate (not shown in FIG. 2) before laser engraving.

Also described herein is a method of laser engraving a heat transfer label. The method comprises positioning the heat transfer label onto a substrate; applying heat and pressure to the printed laminate and the material to bond the heat transfer label to the substrate; removing the support portion; and at least partially laser engraving the first ink layer. The invention in the present application also includes other methods and/or tools used for engraving the graphic design onto the heat transfer label.

In some embodiments, the release layer of the heat transfer label is a coating. In other embodiments, the release layer is a film. In many embodiments, the release layer may comprise a silicone release layer, a wax solution, a wax dispersion, a polymeric binder comprising wax particles, or combinations thereof. Other types are also contemplated.

In many embodiments, the first carrier of the heat transfer label comprises PET film, paper, or combinations thereof. In some embodiments, the first carrier further comprises a thermoset coating comprising polyurethane, acrylics, formaldehyde free melamine resins, or combinations thereof.

In many embodiments, the first ink layer of the heat transfer label comprises polyurethane ink, polyacrylate ink, or combinations thereof. In some embodiments, the second ink layer comprises at least one additive selected from color pigment, glitter pigment, filler and combinations thereof. In one embodiment, the first ink layer comprises one color. In another embodiment, the first ink layer comprises more than one color.

In many embodiments, the adhesive layer of the heat transfer label comprises a polyurethane adhesive, polyamide adhesive, polyester adhesive, ethyl vinyl acetate (EVA) adhesive, acrylic adhesive, or combinations thereof. In many embodiments, the adhesive layer is activated at a temperature between 50° C. and 200° C. In some embodiments, the adhesive layer is activated at a temperature between 50° C. and 180° C. In another embodiment, the adhesive layer is activated at a temperature between 50° C. and 160° C. In yet another embodiment, the adhesive layer is activated at a temperature between 50° C. and 150° C.

In many embodiments, the substrate comprises textiles, yarns, wood, paper, plastic, metal, glass, composites, or combinations thereof. However, other substrates may be contemplated.

In many embodiments of the method, the first ink layer may be laser engraved after the heat transfer label is at least partially disposed on the substrate. Laser engraving may occur through the use of a laser engraving machine. For laser engraving, a laser is used to remove at least a portion of the first ink layer to a specified depth but not penetrate through the substrate. In some embodiments, the laser may remove at least a portion of the ink layer such that the substrate may be visible. For some embodiments, the laser engraving of the first ink layer may have a gloss difference of at least 3.0 GU (gloss units) at a 60-degree angle using ASTM D523 compared to the first ink layer without laser engraving. In other embodiments, the laser engraving of the first ink layer may have a gloss difference of at least 5.0 GU (gloss units) at a 60-degree angle using ASTM D523. In yet other embodiments, the laser engraving of the first ink layer may have a gloss difference of at least 7.0 GU (gloss units) at a 60-degree angle using ASTM D523. In some embodiments, the laser engraving of the first ink layer provides a Delta E (dE) color difference of at least 1.0 using ASTM D2244. In other embodiments, the laser engraving of the first ink layer provides a Delta E (dE) color difference of at least 1.5 using ASTM D2244. In yet another embodiment, the laser engraving of the first ink layer provides a Delta E (dE) color difference of at least 2.0 using ASTM D2244.

In some embodiments, the heat transfer label further comprises a second ink layer having a first side and a second side, wherein the second side of the second ink layer is at least partially disposed on the adhesive layer and the second side of the first ink layer. In many embodiments, the second ink layer comprises polyurethane ink, polyacrylate ink, or combinations thereof. In some embodiments, the second ink layer comprises at least one additive selected from color pigment, glitter pigment, filler and combinations thereof. In one embodiment, the second ink layer comprises one color. In other embodiments, the second ink layer comprises more than one color.

In those embodiments of the method where the second side of the second ink layer is at least partially disposed on the first side of the first ink layer, the second ink layer may be laser engraved after the heat transfer label is at least partially disposed on the substrate. In some embodiments, the laser engraving of the second ink layer has a gloss difference of at least 3.0 GU (gloss units) at a 60-degree angle using ASTM D523 compared to the first ink layer without laser engraving. In other embodiments, the laser engraving of the second ink layer may have a gloss difference of at least 5.0 GU (gloss units) at a 60-degree angle using ASTM D523. In yet other embodiments, the laser engraving of the second ink layer may have a gloss difference of at least 7.0 GU (gloss units) at a 60-degree angle using ASTM D523. In some embodiments, the laser engraving of the second ink layer provides a Delta E (dE) color difference of at least 1.0 using ASTM D2244. In other embodiments, the laser engraving of the second ink layer provides a Delta E (dE) color difference of at least 1.5 using ASTM D2244. In yet another embodiment, the laser engraving of the second ink layer provides a Delta E (dE) color difference of at least 2.0 using ASTM D2244.

Figure 3A:
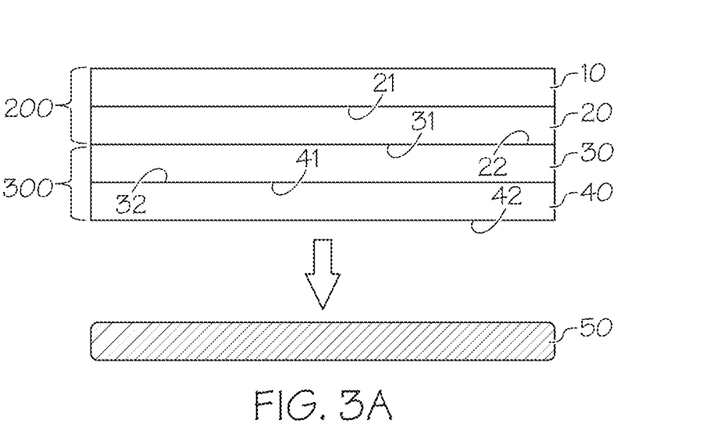
FIG. 3A-3B are exemplary diagrams showing one embodiment of the application of a heat transfer label onto the substrate.
Figure 3B:
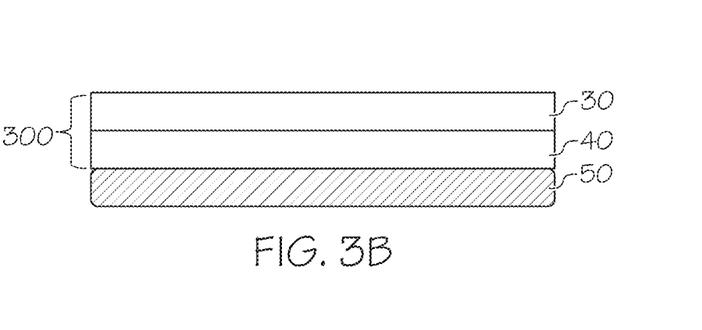

Referring now to exemplary FIG. 3A, an embodiment of the application of the heat transfer label 100 onto the substrate 50 is shown. Here, the heat transfer label 100 comprising a support portion 200 comprising a release layer 20 having a first side 21 and a second side 22 and a first carrier 10 at least partially disposed on the first side 21 of the release layer 20; and a transfer portion 300 comprising a first ink layer 30 having a first side 31 and a second side 32; and an adhesive layer 40 having a first side 41 and a second side 42; is positioned above substrate 50. Heat and/or pressure is applied to the heat transfer label and the substrate to bond the heat transfer label to the substrate; followed by removal of the support portion. The graphic design may be generated by one or more of engraving, marking, etching, vaporizing, melting, annealing, carbon migrating, foaming, coloring, or otherwise affecting the first ink layer using the laser light, such as by altering part of the surface of the first ink layer, removing or changing parts of the first ink layer, or by cutting through the first ink layer, such as into a substrate or second ink layer below the first ink layer.

Figure 4A:
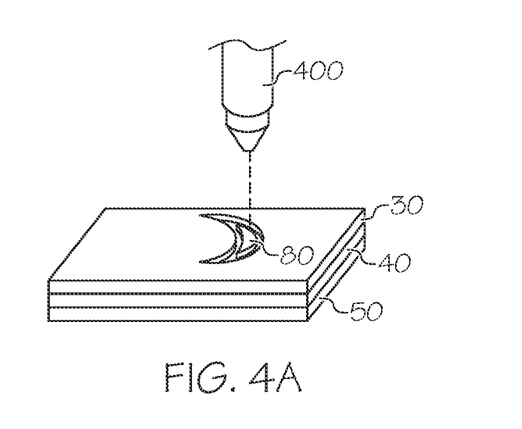
FIG. 4A is an exemplary diagram showing a laser being used to form a graphic design on the heat transfer label bonded the substrate in accordance with some embodiments.

FIGS. 4A-4D illustrate various embodiments of methods of laser engraving or otherwise generating a graphic design. FIG. 4A includes use of a laser 400 to create a modified area 80 in or more of the first layer 30, the second layer 40, or the substrate 50. In various embodiments, the first layer 30 may be an ink layer, the second layer 40 may be an ink layer or an adhesive layer, and the substrate 50 may be an ink layer, an adhesive layer, or a supporting material such as plastic, cloth, wood, glass, ceramic, or metal.

Figure 4B:
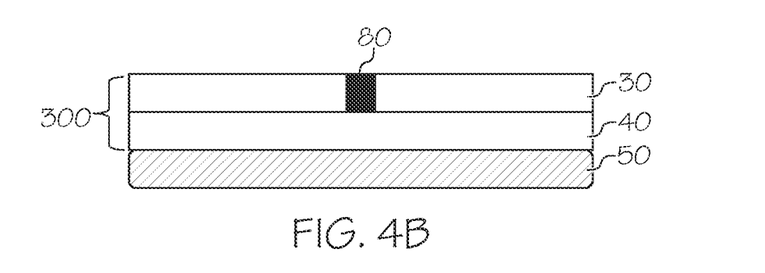
FIG. 4B-4D are exemplary diagrams showing a heat transfer label affected by a laser or other system in accordance with some embodiments.

In FIG. 4B, the first ink layer 30 may be at least partially charred, colored or otherwise marked using the laser light in the modified area 80.

Figure 4C:
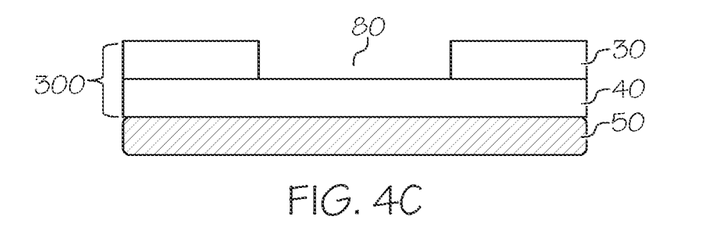

In FIG. 4C, the first ink layer 30 may be vaporized, melted, ablated, etched, partially or entirely through in a modified area 80, which may be surrounded, bordered, or otherwise enclosed by non-modified areas of the first layer 30.

Figure 4D:
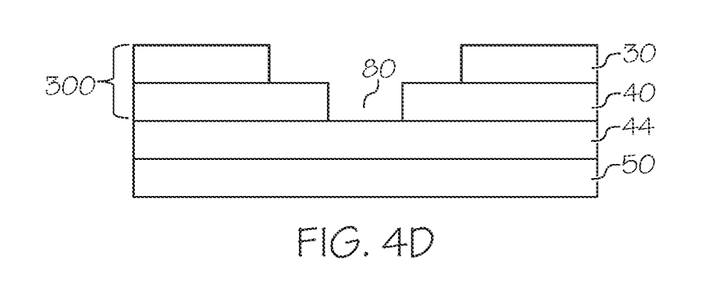

In FIG. 4D, the first layer 30 may be disposed over and in contact with a second layer 40, which may be disposed over and in contact with a third layer 44, which may be disposed over and in contact with a substrate 50. Each of the first layer 30, the second layer 40, and the third layer 44 may be ink layers. In some embodiments, the third layer 44 may be an adhesive layer. In some embodiments, after the first layer 30 has been modified by the laser 400, the second layer 40 may also be modified to form a cavity, channel, or open area that opens into the opening formed within the first layer 30. The opening within the first layer 30 may be wider than or the same size as the opening or cavity formed within the second layer 40. In various embodiments, using the laser to cut through the first layer 30 (e.g., a first ink layer) means cutting at least partially into the second layer 40 (e.g., a second ink layer). In some embodiments, cutting through the second layer 40 means cutting at least partially into the third layer 44.

Figure 5A:
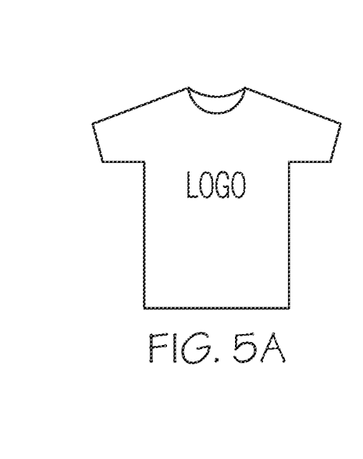
FIG. 5A-5C include various exemplary embodiments of laser affected items.
Figure 5B:
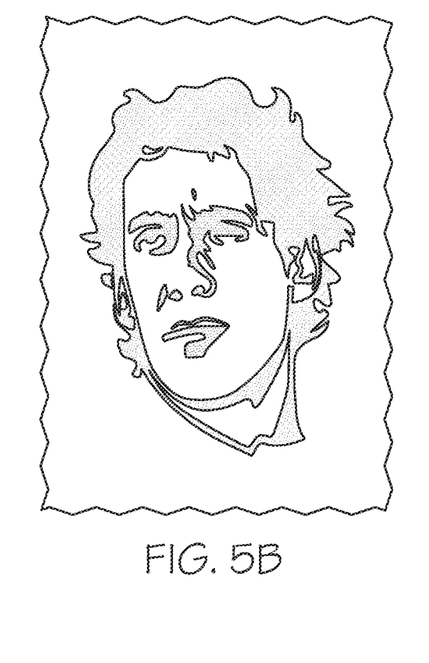
Figure 5C:
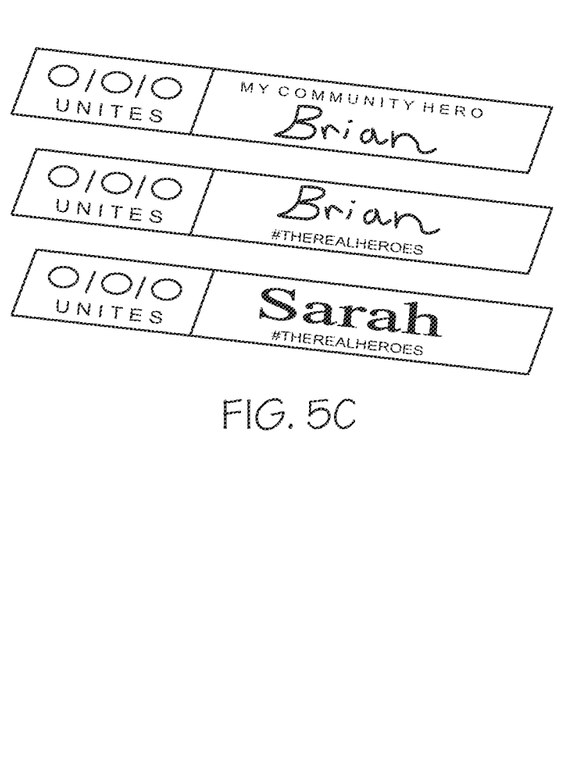

In various embodiments, such as in FIG. 5A-5C, at least part of the methods, materials, and items disclosed herein may be used to bond the label with an article of clothing such as a shirt and a customized graphic design can be engraved or otherwise formed using the laser light after the product is made, including point-of-sale. For example, in FIG. 5A, part or all of the front of an article of clothing, such as a shirt, jacket, sweater, sweatshirt, jersey, or other clothing item, may have one or more sections on which are disposed a heat transfer bearing one, two, three, or more ink layers. In some embodiments, the articles of clothing may be sold without designs in the ink layers. By modifying or engraving the one or more heat transfers that are already bonded to an article of clothing with a laser, a durable, washable, water resistant, custom design may be formed within, through, or beneath one or more ink layers.

FIG. 5B is an example of an alternate design that may be placed on a heat transfer using a laser. For example, the design may include a person's face from a photograph or artwork, a sports player's image, or a natural scene. Other customized images that may be formed on, in, or through the one or more ink layers of the heat transfer may include bar codes, QR codes, serial numbers, or other indicia.

FIG. 5C illustrate various items that may be customized, such as a heat transfer attached to or forming tags or labels. For example, a tag may include a customizable section of a heat transfer bearing one or more ink layers. The heat transfer may be the entire label or tag, or it may be a subsection of a label or tag. The ink layer that may be modified by the laser may cover the entire heat transfer, or may cover a subsection of the heat transfer. For example, in FIG. 5C, the customized portion of a label may be an area where the name "Brian" is etched, burned, melted, ablated, cut through, or otherwise formed by modifying part of an ink layer on a heat transfer.

In various embodiments, one or more parts of the methods, materials, devices, and items disclosed herein may be used to bond the heat transfer label to articles such as laminates, films, fabrics, signs, vehicles, buildings, tools, paper, plastic, cardboard, shoes, jackets, furniture, electronic devices, phones, phone cases, or other items.

In various embodiments, the engravable/modifiable heat transfer label as disclosed in the present application can be used for creating memorabilia, such as signature or sketch of the favourite personality, finishing time and/or place of the events like marathon. In some embodiments, the engravable heat transfer label comprises a digitally printed fixed image and a separate area for the laser engraving of the graphic image at the later stage, such as name tags of for a laundry or rental gear or a name badge for new employee, wherein a logo of a company or another image is digitally printed on the label and a separate area is reserved for the laser engraving of the variable component, such as a name. In other embodiments, the engravable heat transfer label allows customer to freedom to customize their own graphic design at home with help of laser engravers, etchers, and cutters readily available at a workshop or printing location.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An engravable heat transfer label configured for use on clothing comprising:
 a support portion comprising a release layer having a first side and a second side and a first carrier at least partially disposed on the first side of the release layer; and
 a transfer portion comprising:
  an engravable first ink layer having a first side and a second side; and
  an adhesive layer having a first side and a second side;
  wherein the second side of the first ink layer is at least partially disposed on the first side of the adhesive layer;
  wherein the second side of the release layer is at least partially disposed on the first side of the first ink layer;
  wherein a graphic design is engraved on the first ink layer using a laser light;
  wherein the graphic design being engraved after the heat transfer label is at least partially bonded onto a substrate;
  wherein the laser engraving of the first ink layer has a gloss difference of at least 3.0 GU (gloss units) at a 60-degree angle using ASTM D523; and
  wherein the first ink layer comprises polyacrylate ink or a combination of polyurethane ink and polyacrylate ink.

2. The heat transfer label of claim 1, wherein the release layer comprises a silicone release layer, a wax solution, a wax dispersion, a polymeric binder comprising wax particles, or combinations thereof.

3. The heat transfer label of claim 1, wherein the first carrier further comprises a thermoset coating comprising polyurethane, acrylics, formaldehyde free melamine resins, or combinations thereof.

4. The heat transfer label of claim 1, wherein the first ink layer comprises at least one additive selected from color pigment, glitter pigment, filler and combinations thereof.

5. The heat transfer label of claim 1, wherein the adhesive layer comprises a polyurethane adhesive, polyamide adhesive, polyester adhesive, ethyl vinyl acetate (EVA) adhesive, acrylic adhesive, or combinations thereof.

6. The heat transfer label of claim 1, wherein the adhesive layer is activated at a temperature between 50° C. and 200° C.

7. The heat transfer label of claim 1 further comprising a second ink layer having a first side and a second side, wherein the second side of the second ink layer is at least partially disposed on the first side of the adhesive layer and the first side of the second ink layer is at least partially disposed on the second side of the first ink layer.

8. The heat transfer label of claim 7, wherein the second ink layer comprises polyurethane ink, polyacrylate ink, or combinations thereof.

9. The heat transfer label of claim 7, wherein the second ink layer comprises at least one additive selected from color pigment, glitter pigment, filler and combinations thereof.

10. The heat transfer label of claim 7, wherein the graphic design is engraved on the second ink layer using the laser light; and wherein the graphic design being engraved after the heat transfer label is at least partially bonded onto the substrate.

11. The heat transfer label of claim 10, wherein the laser engraving of the second ink layer has a gloss difference of at least 3.0 GU (gloss units) at a 60-degree angle using ASTM D523; and wherein the laser engraving of the second ink layer provides a Delta E (dE) color difference of at least 1.0 using ASTM D2244.

12. The heat transfer label of claim 7, further comprising at least one additional ink layer, at least partially disposed on the first side of the second ink layer.

13. The heat transfer label of claim 1, further comprising a second carrier on the transfer portion, wherein the second carrier is at least partially disposed on the second side of the adhesive layer.

14. The heat transfer label of claim 1, wherein the laser engraving of the first ink layer provides a Delta E (dE) color difference of at least 1.0 using ASTM D2244.

15. An engravable heat transfer label comprising:

a support portion comprising a release layer having a first side and a second side and a first carrier at least partially disposed on the first side of the release layer; and a transfer portion comprising:

an engravable first ink layer having a first side and a second side, wherein the first ink layer comprises polyacrylate ink or a combination of polyurethane ink and polyacrylate ink;

a second ink layer having a first side and a second side, wherein the second side of the second ink layer is at least partially disposed on the first side of the adhesive layer and the first side of the second ink layer is at least partially disposed on the second side of the first ink layer;

a third ink layer having a first side and a second side; and an adhesive layer having a first side and a second side;

wherein the second side of the first ink layer is at least partially disposed on the first side of the second ink layer, and the second side of the second ink layer is at least partially disposed on the first side of the third ink layer, and the second side of the third ink layer is at least partially disposed on the first side of the adhesive layer;

wherein engraving forms an opening in the first ink layer and the second ink layer, and the opening in the first ink layer is wider in at least one location than the opening in the second ink layer, and the opening in the second ink layer opens into the opening in the first layer, and the third ink layer is uncovered through the opening in the second ink layer;

wherein the second side of the release layer is at least partially disposed on the first side of the first ink layer;

wherein a graphic design is engraved on the first ink layer using a laser; and wherein the graphic design being engraved after the heat transfer label is at least partially bonded onto a substrate.

\* \* \* \* \*